T. A. BURNS AND D. J. HUETHER.
APPARATUS FOR SOLUTIONING TIRE BEADS.
APPLICATION FILED NOV. 29, 1920.
1,395,036. Patented Oct. 25, 1921.
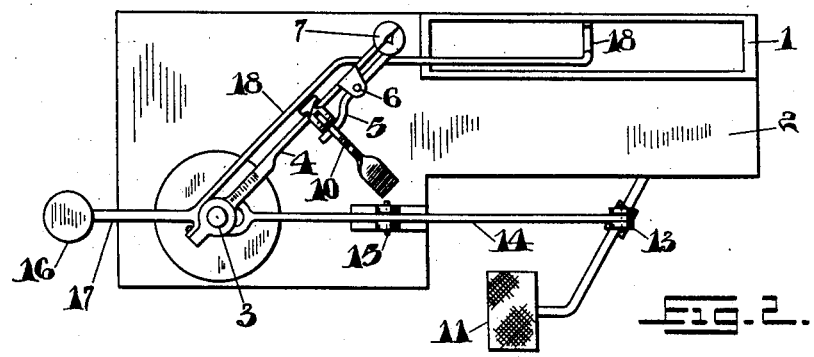
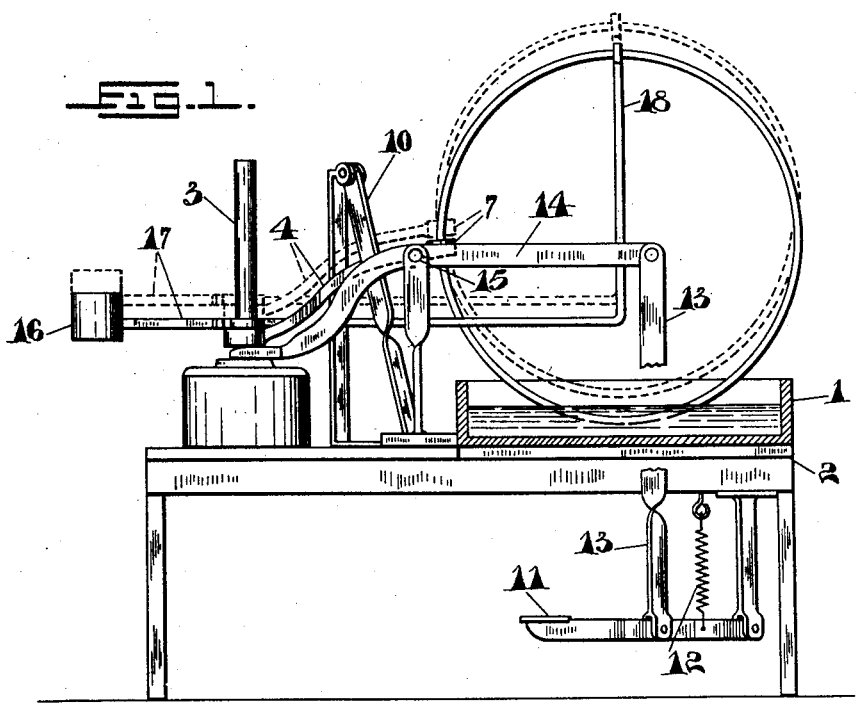
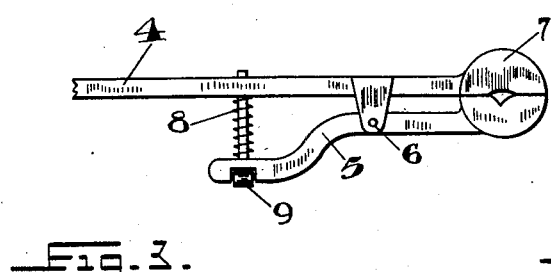
INVENTORS.
T. A. Burns.
D. J. Huether.
BY J. Edward Maybee.
ATTY.

UNITED STATES PATENT OFFICE.

THOMAS A. BURNS AND DAVID J. HUETHER, OF TORONTO, ONTARIO, CANADA, ASSIGNORS TO DUNLOP TIRE AND RUBBER GOODS COMPANY, LIMITED, OF TORONTO, ONTARIO, CANADA.

APPARATUS FOR SOLUTIONING TIRE-BEADS.

1,395,036.  Specification of Letters Patent.  Patented Oct. 25, 1921.

Application filed November 29, 1920. Serial No. 426,998.

*To all whom it may concern:*

Be it known that we, THOMAS A. BURNS and DAVID J. HUETHER, of the city of Toronto, in the county of York, Province of Ontario, Canada, subjects of the King of Great Britain, have invented certain new and useful Improvements in Apparatus for Solutioning Tire-Beads, of which the following is a specification.

Pneumatic tire casings are commonly constructed with beads which are incorporated in the carcass adjacent its edges and in the process of manufacture it becomes necessary to coat such beads with a solution of rubber in a suitable solvent. Much difficulty is experienced in applying the solution evenly and the process is wasteful and slow.

In co-pending application No. 426,997, filed Nov. 29, 1920, is disclosed apparatus by means of which tire beads may be rapidly and evenly coated. The apparatus therein illustrated is very satisfactory when operating on beads in the form of strips, but is somewhat troublesome when operating on annular beads, and our object in the present invention is to devise apparatus particularly adapted for use with annular beads, while it may, if desired, be used in solutioning beads formed in strips.

We attain our object by means of the constructions hereinafter described and illustrated in the accompanying drawings in which—

Figure 1 is a front elevation of apparatus constructed in accordance with our invention;

Fig. 2 a plan view of the same; and

Fig. 3 a plan view of the die and die carrying arms on a larger scale.

In the drawings like numerals of reference indicate corresponding parts in the different figures.

1 is a solution tank, preferably supported on a frame 2. On this frame 2 is supported a vertical guide 3. On this guide is slidably supported a die supporting arm 4. This arm has an arm 5 hinged thereon at 6. The two arms carry the parts of the divided die 7, the opening in the die being of substantially the same shape in cross section as the cross section of the tire bead, but of slightly greater dimensions.

Means are provided for moving the arms relative to one another to open and close the die to receive the bead. Preferably a coil spring 8 engaging the two arms tends to close the die and means are provided to engage the two arms to open the die. It will be noted that the end of the hinged arm 5 is provided with an anti-friction roller 9. The arms 4 and 5 lie between the sides of a wedge-shaped frame 10 so arranged that if the arms are moved vertically, the converging sides will engage the arm 4 and the friction roller 9 on the arm 5 and press them toward one another, thus opening the die.

We prefer to arrange the apparatus so that this up and down movement may be effected by the depression of a pedal 11. This pedal is suitably fulcrumed and is yieldingly held in its normal position by a coil spring 12. By means of a link 13, the pedal is pivotally connected with one end of a lever 14 fulcrumed intermediate its ends on the fulcrum 15. The other end of the lever embraces the guide 3 below the arm 4 so that the depression of the pedal will raise this arm.

As soon as the foot pedal is released, the return of the arm to the normal position is effected by the weight 16 secured to an arm 17, which embraces the guide 3, and is vertically movable thereon. This arm is extended to form a bead supporting frame 18 on which the bead may be hung as shown.

The operation of the device is as follows. The pedal is first depressed to open the die. A bead is placed in position in the die and hung on the supporting frame 18. The pedal is allowed to raise, whereupon the die closes and the bead is dipped in the solution. The bead is then rotated by hand to draw it through the solution and to strip off surplus solution at the die. As soon as all the bead has passed through the solution in the tank, the pedal may be slightly depressed to raise the bead out of the solution and the bead will then be further rotated to complete the process of stripping off and distributing the solution. Further depression of the pedal opens up the die and enables the solutioned bead to be removed and a new one placed in position.

What we claim as our invention is—

1. Apparatus for solutioning tire beads comprising a solution tank; a supporting frame for an annular bead mounted so that it may be moved vertically to dip a bead into the solution tank or lift it therefrom; and a suitably supported divided die adapted to be opened to receive and embrace the bead and to remove surplus solution as the bead is drawn through it.

2. Apparatus for solutioning tire beads comprising a solution tank; a supporting frame for an annular bead mounted so that it may be moved vertically to dip a bead into the solution tank or lift it therefrom; and a suitably supported vertically movable divided die adapted to be opened to receive and embrace the bead and to remove surplus solution as the bead is drawn through it; and means for simultaneously raising or lowering the bead supporting frame and the die.

3. Apparatus for solutioning tire beads comprising a solution tank; a supporting frame for an annular bead mounted so that it may be moved vertically to dip a bead into the solution tank or lift it therefrom; a suitably supported vertically movable divided die adapted to be opened to receive and embrace the bead and to remove surplus solution as the bead is drawn through it; means for simultaneously raising or lowering the bead suporting frame and the die; and means whereby the raising of the die above a predetermined position opens it and the lowering of the die closes it.

4. Apparatus for solutioning tire beads comprising a solution tank; a suitably supported vertically movable divided die adapted to be operated to embrace the bead and to remove surplus solution as the bead is drawn through it; and means whereby the raising of the die above a predetermined position opens it and the lowering of the die closes it.

5. Apparatus for solutioning tire beads comprising a solution tank; a die support; a divided die adapted to remove surplus solution as a bead is drawn through it; a supporting arm carrying part of the divided die; and an arm hinged on the supporting arm carrying the other part of the die.

6. Apparatus for solutioning tire beads comprising a solution tank; a die support; a divided die adapted to remove surplus solution as a bead is drawn through it; a supporting arm carrying part of the divided die; an arm hinged on the supporting arm carrying the other part of the die; a guide on which the supporting arm is vertically movable; and means whereby the hinged arm is actuated to open and close the die by the movement of the supporting arm.

7. Apparatus for solutioning tire beads comprising a solution tank; a die support; a divided die adapted to remove surplus solution as a bead is drawn through it; a supporting arm carrying part of the divided die; an arm hinged on the supporting arm carrying the other part of the die; a guide on which the supporting arm is vertically movable; means whereby the hinged arm is actuated to open and close the die by the movement of the supporting arm; and a bead supporting frame movable with the supporting arm aforesaid.

Signed at Toronto this eleventh day of November, 1920.

THOMAS A. BURNS. [L. S.]
DAVID J. HUETHER. [L. S.]